United States Patent [19]
Okumura et al.

[11] Patent Number: 6,002,884
[45] Date of Patent: *Dec. 14, 1999

[54] WATERPROOF MECHANISM, SEALING MEMBER, AND CAMERA INCLUDING THE SAME

[75] Inventors: Koichi Okumura, Sakai; Tomohiko Kawaji, Osaka, both of Japan

[73] Assignee: Minolta Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/788,164

[22] Filed: Jan. 24, 1997

[30] Foreign Application Priority Data

Jan. 26, 1996 [JP] Japan ...................................... 8-011754

[51] Int. Cl.⁶ .............................. G03B 17/08; G03B 17/02
[52] U.S. Cl. .............................. 396/25; 396/29; 396/536; 396/539
[58] Field of Search ................................... 396/25, 26, 27, 396/28, 29, 536, 538, 539; 277/648, 921

[56] References Cited

U.S. PATENT DOCUMENTS

| | | | |
|---|---|---|---|
| 2,581,647 | 1/1952 | Genovese | 277/921 |
| 3,501,868 | 3/1970 | Ganzinotti | 277/921 |
| 4,130,213 | 12/1978 | Wszolek | 277/921 |
| 4,375,323 | 3/1983 | Inagaki et al. | 396/29 |
| 4,803,504 | 2/1989 | Maeno et al. | 396/29 |
| 4,998,550 | 3/1991 | Archambault | 277/921 |
| 5,066,965 | 11/1991 | Tanaka et al. | 396/29 |
| 5,285,894 | 2/1994 | Kamata et al. | 396/27 |
| 5,432,573 | 7/1995 | Lawther et al. | 396/538 |
| 5,530,499 | 6/1996 | Mori | 396/29 |
| 5,621,493 | 4/1997 | Wada et al. | 396/538 |

FOREIGN PATENT DOCUMENTS

| | | |
|---|---|---|
| 4-80734 | 3/1992 | Japan . |
| 4-96037 | 3/1992 | Japan . |
| 6-312760 | 11/1994 | Japan . |

*Primary Examiner*—Eddie C. Lee
*Attorney, Agent, or Firm*—Burns, Doane, Swecker & Mathis, LLP

[57] ABSTRACT

A waterproof mechanism for cartridge holder 4 that moves between a housed position inside the camera body and a cartridge reception/removal position at which the cartridge insertion opening is exposed outside the camera body, wherein elastic sealing member 5, which comprises flat part 51 that is sandwiched between cartridge holder 4 and holder cover 6 when the latter is attached to the former and seal area 55 that is located along the edges of said flat part 51 and extends next to and all around the edges of the holder cover and that creates a watertight seal between the camera body and holder cover 6 when the cartridge holder is in the housed position, the flat part 51 and seal area 55 being integrally formed as one unit, is placed such that said elastic sealing member 5 will be sandwiched between cartridge holder 4 and holder cover 6 when the latter is attached to the former.

21 Claims, 5 Drawing Sheets

WATERPROOF MECHANISM, SEALING MEMBER, AND CAMERA INCLUDING THE SAME

BACKGROUND OF THE INVENTION

1. Field of the Invention

The present invention pertains to a waterproof mechanism that is suitable for cameras having a cartridge holder which houses a film cartridge so that the cartridge may be inserted into and removed from the camera body. The present invention also pertains to a sealing member used in the waterproof mechanism. The present invention further pertains to a camera including the waterproof mechanism.

2. Description of the Related Art

The conventional art related to the waterproof mechanism of the present invention is explained below using a camera as an example.

As a film insertion mechanism for a camera, a mechanism in which the insertion of film is completed by opening a rear cover of the camera to place a film cartridge in a prescribed position inside the camera, pulling the end of the film out of the cartridge so that the film will be engaged with the spool, and closing the rear cover to activate winding has been conventionally known. Waterproofing of the rear cover of the camera having such a film insertion mechanism using a rear cover is effected by mounting to the rear cover a ring-shaped rubber packing that covers the entire inside rim of the rear cover.

On the other hand, a mechanism has been proposed that has a tilt-type or slide-type cartridge holder, in which a film is automatically fed out from the cartridge and film insertion is completed by placing the cartridge in the cartridge holder which is removable from the camera body, and returning the cartridge holder to the camera body.

FIGS. 1 and 2 show perspective views of important components to outline the tilt-type cartridge holder. As shown in these drawings, cartridge holder 4 that houses a film cartridge may be moved from the housed position inside the camera body (the position shown in FIG. 1) to the cartridge reception/removal position (the position shown in FIG. 2) with pin 21 as the rotation shaft. In other words, at the cartridge reception/removal position shown in FIG. 2, cartridge insertion opening 41 formed on the top of cartridge holder 4 is exposed outside the camera body, and a film cartridge (not shown in the drawing) may be inserted into cartridge holder 4 from opening 41. When cartridge holder 4 housing a cartridge is moved with pin 21 as the rotation shaft back to the housed position shown in FIG. 1, the film inside the cartridge is automatically fed out from film outlet 43 and wound around the spool (not shown in the drawing), whereupon film insertion is completed.

As shown in FIG. 1, plate-shaped holder cover 6 is attached to cartridge holder 4. The holder cover 6 constitutes a part of exterior cover 1 of the entire camera when cartridge holder 4 is in the housed position, and moves together with cartridge holder 4 when cartridge holder 4 moves to the cartridge reception/removal position. In FIGS. 1 and 2, the positions of photo-taking lens 3, distance measurement window 22, finder window 23, shutter release button 24 and finder 25 are shown using chain lines.

On the other hand, a slide-type cartridge holder does not become tilted, but slides from a housed position in the camera body to a cartridge reception/removal position outside the camera body and vice versa.

In order to waterproof the tilt-type or slide-type cartridge holder like the rear cover in the rear cover-type film insertion mechanism described above, it is necessary to form an overlapping part at the border between the cartridge holder cover and the camera body, as well as to install a ring-shaped rubber packing that covers the entire rim of the overlapping part.

Incidentally, whether with the rear cover-type film insertion mechanism or with the film insertion mechanism using a tilt-type or slide-type cartridge holder, an increase in the number of manufacturing processes, such as the formation of a guide groove for correct positioning and the insertion of the ring-shaped packing in the guide groove, is inevitable in order to mount a ring-shaped rubber packing to a prescribed position. In addition, there are a number of other factors that lead to an increase in costs, including the need to use an adhesive to affix the packing.

SUMMARY OF THE INVENTION

The object of the present invention is to provide a novel and useful waterproof mechanism, sealing member and camera in which the problems described above are resolved.

Another object of the present invention is to provide a waterproof mechanism that is easy to manufacture and that does not involve an increase in costs.

Yet another object of the present invention is to provide a waterproof mechanism in which it is not necessary to form a positioning groove or use an adhesive in order to affix the sealing member.

Yet another object of the present invention is to provide a sealing member that is easy to place and that can reliably provide waterproofing.

The present invention was designed in order to effectively resolve the problems described above. It pertains to a waterproof mechanism comprising an opening in a wall of a body of a main device; a cover for closing said opening; a support member which supports said cover and moves the cover between a closed position at which the opening is closed and an open position at which the opening opens; and a sealing member which faces at least an entire rim of the cover and forms liquid-tight seal between the body and the cover, wherein said sealing member is sandwiched between the support member and the cover.

The present invention also pertains to a sealing member which is formed of an elastic material and has a flat part and a wall part formed on an entire rim thereof.

The present invention further pertains to a camera comprising: a camera body having a room for accommodating an external part; an opening connected to said room; a cover for closing said opening; a support member which supports said cover and moves the cover between a closed position at which the opening is closed and a open position at which the opening opens; and a sealing member which faces at least an entire rim of the cover and is capable of forming liquid-tight seal between the body and the cover, wherein said sealing member is sandwiched between the support member and the cover.

These and other objects, advantages and features of the invention will become apparent from the following description thereof taken in conjunction with the accompanying drawings which illustrate specific embodiment of the invention.

BRIEF DESCRIPTION OF THE DRAWINGS

In the following description, like parts are designated by like reference numbers throughout the several drawings.

DESCRIPTION OF THE PREFERRED EMBODIMENT

An embodiment of the present invention is explained below in detail with reference to FIGS. 3 and 4.

Figure 1:
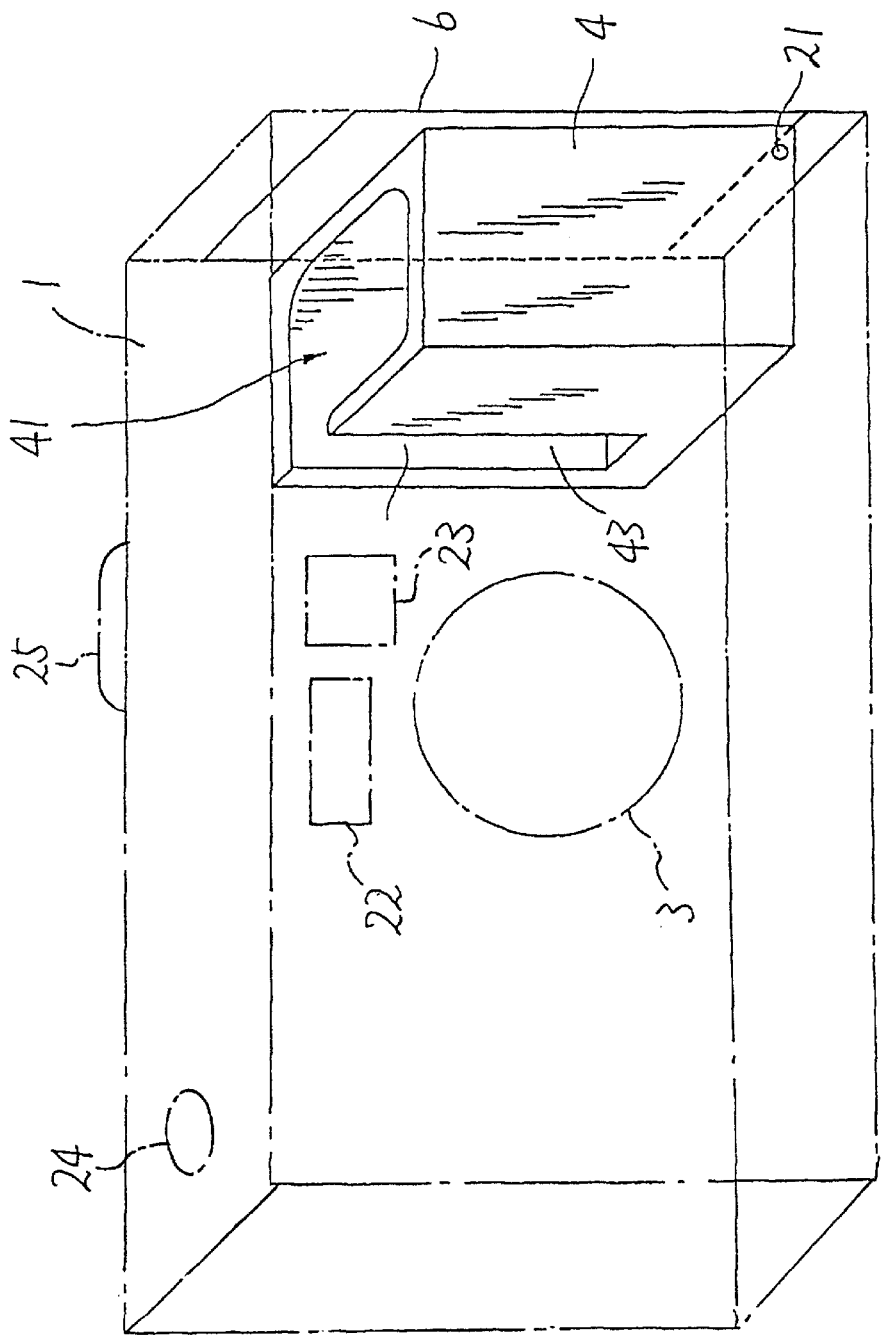
FIG. 1 is a perspective view of important components showing the situation in which a tilt-type cartridge holder is in the housed position inside the camera body.
Figure 2:
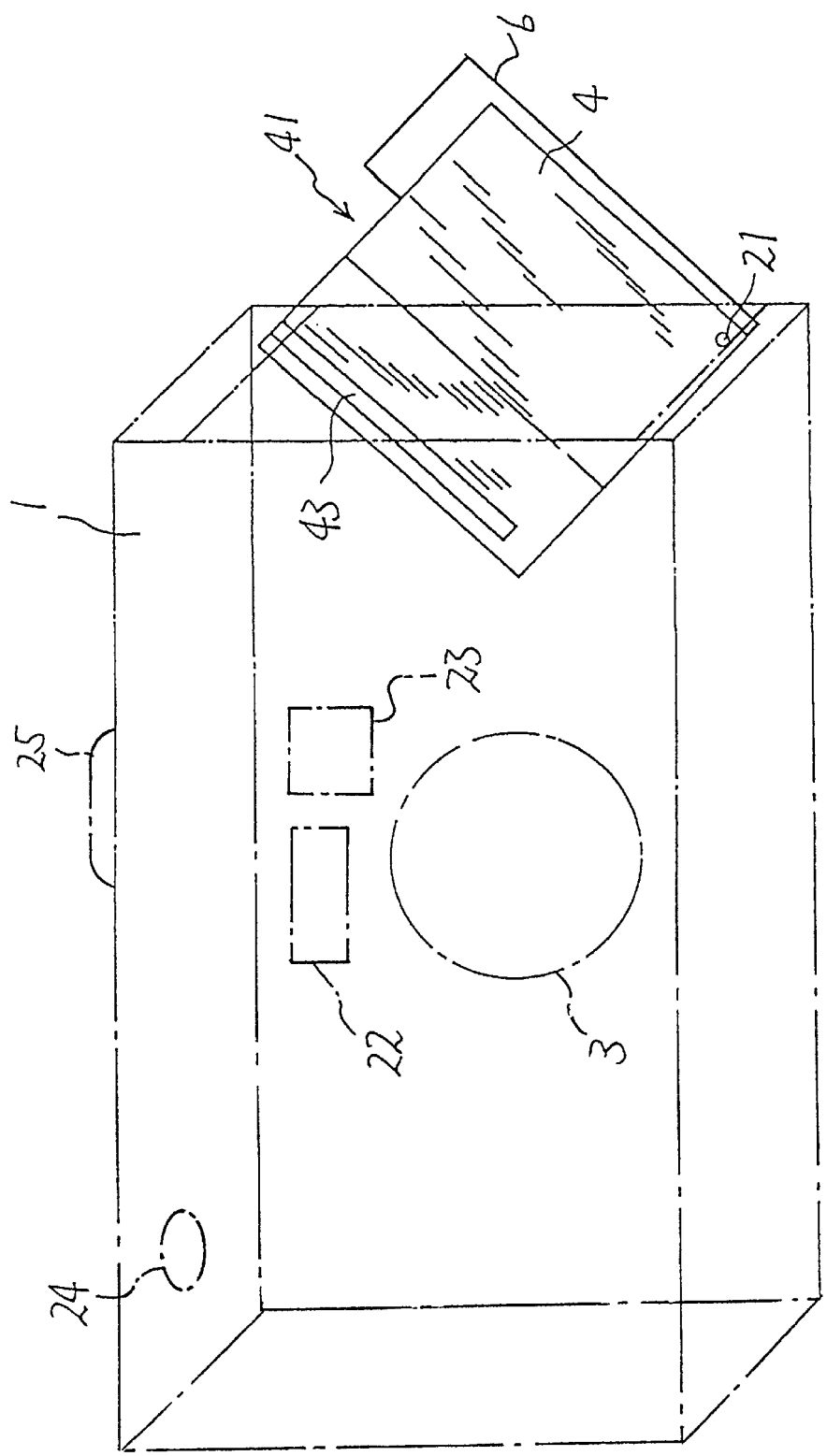
FIG. 2 is a perspective view of important components showing the situation in which the tilt-type cartridge holder is in the cartridge reception/removal position outside the camera body.
Figure 3:
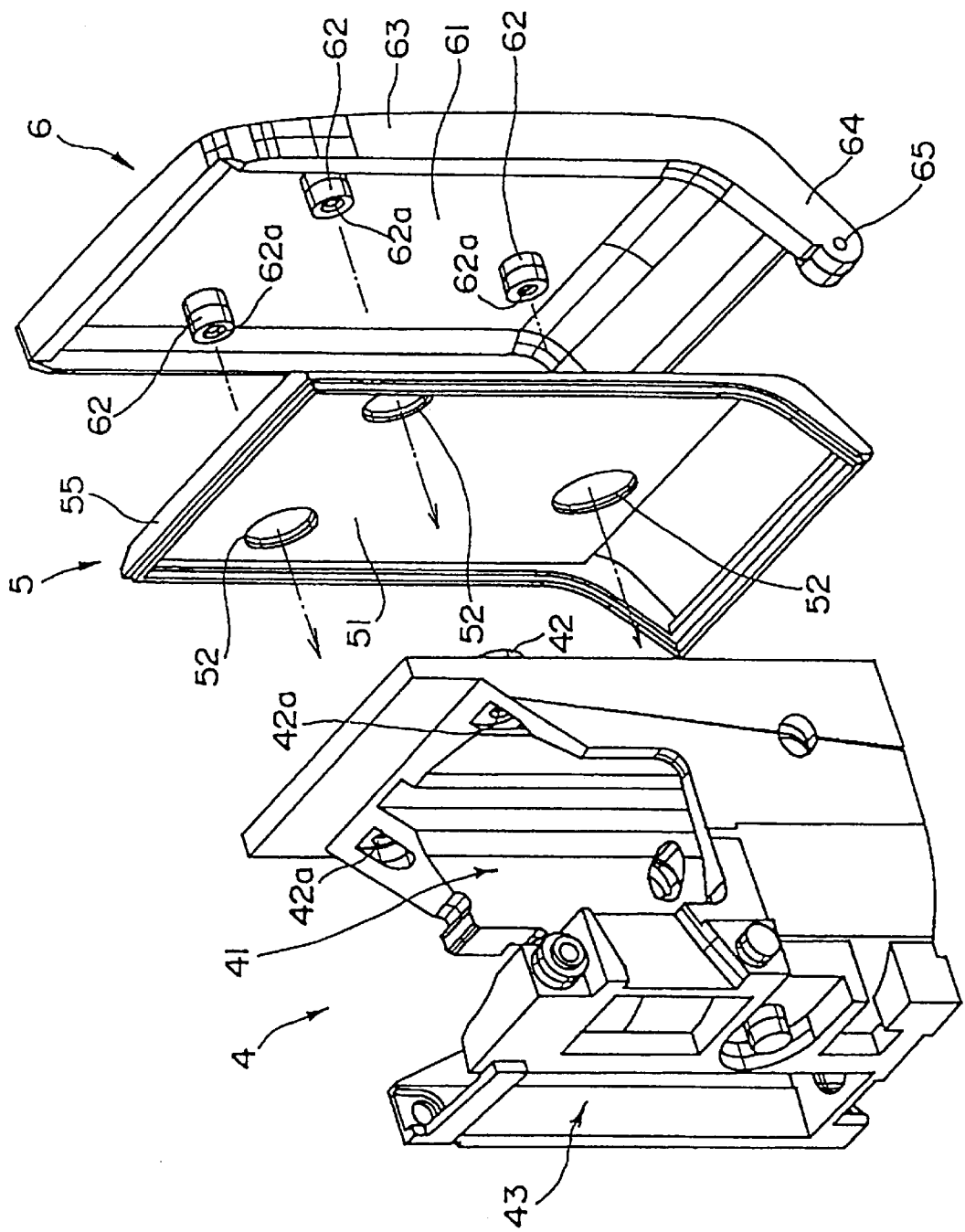
FIG. 3 is a perspective view showing a cartridge holder equipped with a waterproof mechanism, one embodiment of the present invention, in a disassembled fashion.

FIG. 3 is a perspective view showing a camera equipped with the waterproof mechanism pertaining to one embodiment of the present invention in a disassembled fashion, in order to explain the tilt-type cartridge holder. Cartridge holder 4 is movable from the housed position inside the camera body to the cartridge reception/removal position in the same manner as the cartridge holder shown in FIGS. 1 and 2.

At the cartridge reception/removal position, the top opening of cartridge bay 41 of cartridge holder 4 is exposed outside the camera body, such that a film cartridge (not shown in the drawing) may be inserted in cartridge bay 41 via this opening. In addition, cartridge holder 4 has film outlet 43 from which the film is fed out when cartridge holder 4 is in the housed position (see FIG. 1).

Holder cover 6 is attached to cartridge holder 4. The cover 6 constitutes a part of exterior cover of the camera (see FIG. 1) when cartridge holder 4 is returned to the housed position. Holder cover 6 includes exterior part 61 that has essentially a rectangular flat-plate configuration and rim walls 63 that are formed along the top and side edges of exterior part 61, the exterior part 61 and rim walls 63 being formed as one unit by a molding or the like method. The lower end of exterior part 61 is slightly tilted toward the camera body (toward the left in FIG. 3). Movement arms 64 extend down diagonally from rim walls 63 that correspond to the side edges of exterior part 61, along the slope of the lower end of exterior part 61. Pin holes 65, into which pins (not shown in the drawing) that work as rotation shafts are inserted, are formed on these movement arms 64.

Cylindrical protrusions 62 are formed at three locations on the rear surface of exterior part 61, and screw holes 62a for screw fixing are formed in these protrusions 62. On the other hand, three cylindrical bosses 42 that receive cylindrical protrusions 62 that protrude from the rear surface of exterior part 61 of holder cover 6 are formed on the side surface of cartridge holder 4. Openings 42a to allow the passage of fixing screws 70 (see FIG. 4) are formed at positions surrounded by said bosses 42. Holder cover 6 is fixed to cartridge holder 4 by engaging protrusions 62 that protrude from the rear surface of exterior part 61 with cylindrical bosses 42 that protrude from the side surface of cartridge holder 4, and by screwing screws 70 passing through openings 42a into screw holes 62a.

While holder cover 6 is attached to cartridge holder 4 as described above, elastic sealing member 5, which has the overall configuration of a flat plate, is inserted between holder cover 6 and cartridge holder 4 during the attachment.

Elastic sealing member 5 is entirely and uniformly formed of an elastic material such as rubber, and has an essentially rectangular flat part 51 and rim walls (sealing part) 55 formed along the edges of flat part 51. The lower end of flat part 51 is tilted toward the camera body along the slope of the lower end of exterior part 61 of holder cover 6. Openings 52 are formed on flat part 51 at positions that correspond to cylindrical bosses 42 protruding from the side surface of cartridge holder 4. In other words, elastic sealing member 5 is positioned by placing openings 52 over bosses 42. Therefore, the diameter of opening 52 formed on flat part 51 is approximately the same as the outer diameter of cylindrical boss 42.

Figure 4:
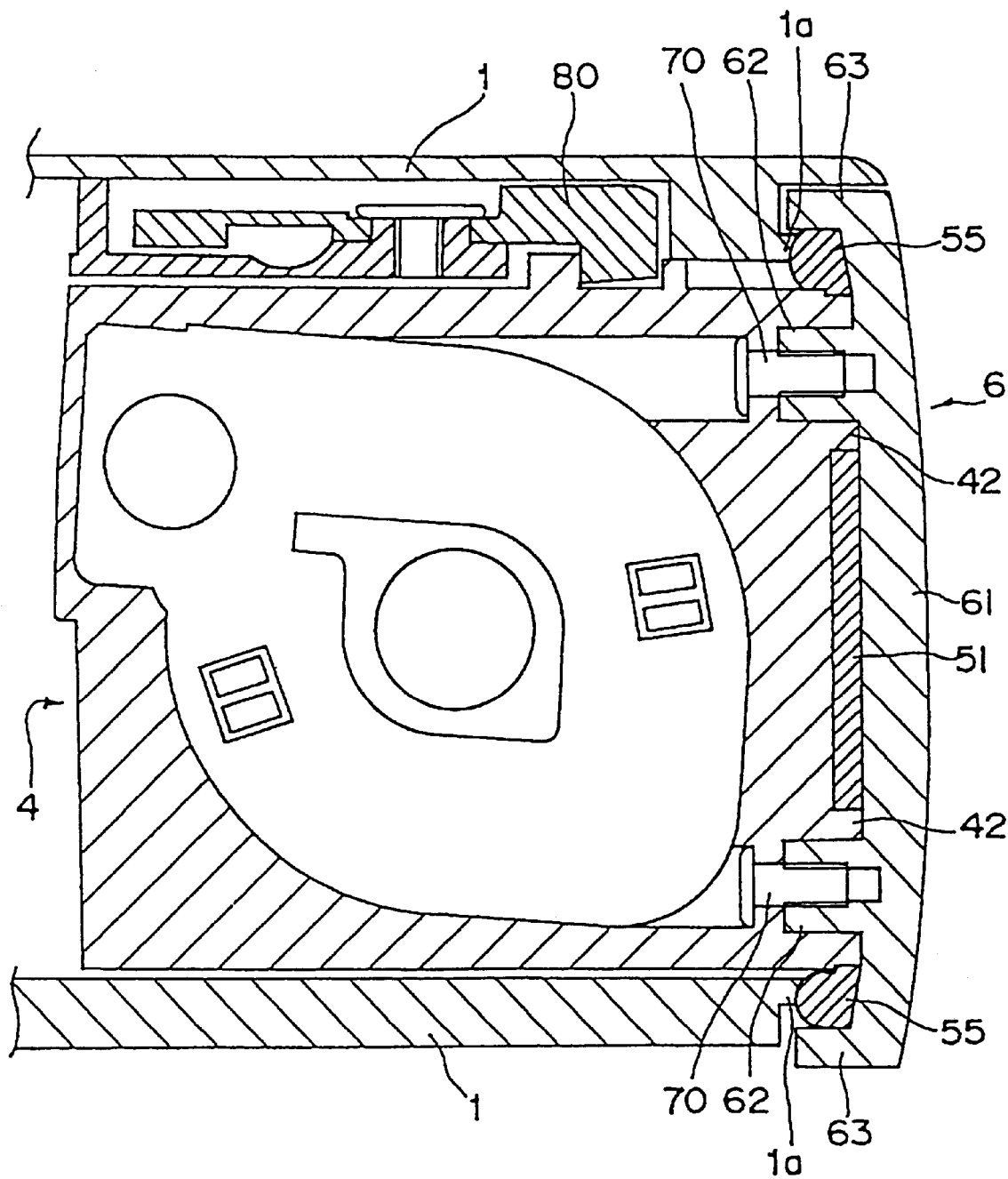
FIG. 4 is a transverse cross-sectional view of important components showing the cartridge holder in FIG. 3 after assembly and in the housed position.
Figure 5:
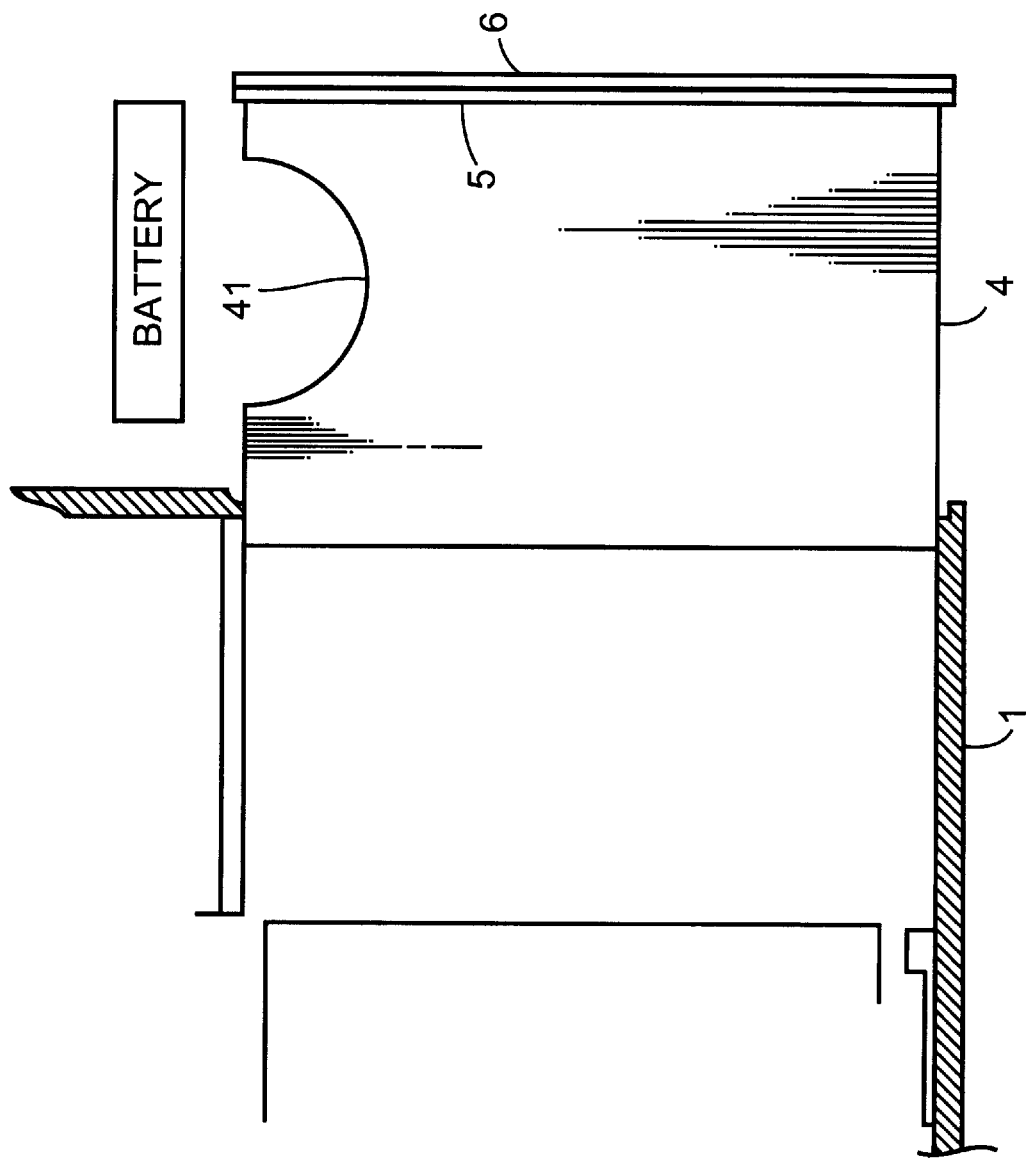
FIG. 5 is a schematic view of the present invention having a slide type cartridge holder.

FIG. 4 shows a transverse cross-sectional view of important components when the cartridge holder assembled as described above is in the housed position inside the camera body.

As can be seen from FIG. 4, rim walls 55 of elastic sealing member 5 are compressed and sandwiched between the inner surfaces of rim walls 63 of holder cover 6 and edges 1a of exterior cover 1, a part of the camera body, creating a watertight seal. The watertight seal is formed all around the edges of holder cover 6, as is clear from FIG. 3. Member 80 in FIG. 4 is a stopper to maintain cartridge holder 4 in the housed position.

As described above, waterproofing can be achieved easily and reliably by simply sandwiching a flat plate-shaped elastic sealing member 5 between holder cover 6 and cartridge holder 4 when the former is attached to the latter. In other words, simply by adding a process in which a sealing member is prepared and the sealing member is sandwiched between cartridge holder 4 and holder cover 6 when the latter is attached to the former, waterproofing can be achieved easily and reliably. As a result, it is not necessary to form a groove for the positioning of a sealing member or to insert a sealing member in such a groove, nor is it necessary to separately prepare an adhesive, etc. for the affixing of a sealing member. This is advantageous in terms of cost.

While an explanation of the embodiment described above was provided using a tilt-type cartridge holder, the present invention may be similarly applied in a slide-type cartridge holder as well. In such tilt-type and slide-type cartridge holders, the construction described above in which a cover that comprises part of the exterior of the camera body is attached to the holder that houses a cartridge is usually employed in order to simplify the manufacturing process of the camera. Therefore, the waterproof mechanism may be easily incorporated without making major changes to the construction of the cartridge holder or the manufacturing process.

Further, while an explanation was provided regarding the waterproof mechanism for a cartridge holder in the embodiment described above, the present invention is not limited to this. For example, it may be used as a waterproof means for an opening/closing mechanism including a holder to house a battery and its cover. In other words, the present invention may be applied to any opening/closing area that is used for the insertion and removal of a member to be inserted in the camera.

Moreover, while an explanation was provided based on an example in which an elastic sealing member that is entirely and uniformly made of an elastic material such as rubber and that comprises a flat part and rim walls formed along the edges of said flat part 51, the invention is not limited to this. A ring-shaped sealing member 105 may be used instead. In this case, the sealing member should be sandwiched between the opening/closing member and the cover member after having the ring shaped sealing member face the edges of the cover member.

Furthermore, while an explanation was provided using a camera as an example in the embodiment described above, the invention is not limited to this. The present invention may be applied to any device that has an opening/closing area.

In addition, there are no limitations as to the position of the opening/closing area on the body of the main device. It may be located on the side, top or bottom of the body of the main device.

Although the present invention has been fully described by way of examples with reference to the accompanying drawings, it is to be noted that various changes and modifications will be apparent to those skilled in the art.

Therefore, unless otherwise such changes and modifications depart from the scope of the present invention, they should be construed as being included therein.

What is claimed is:

1. A waterproof mechanism comprising: an opening in a wall of a body of a main device; a cover for closing said opening;
   a housing receptacle for receiving an external part, said housing is connected to said cover and moves with the cover between a closed position at which the opening is closed and an open position at which the opening opens; and
   a sealing member which faces at least an entire rim of the cover and forms a liquid-tight seal between the body and the cover, wherein said sealing member is sandwiched between the housing and the cover.

2. The waterproof mechanism as claimed in claim 1 wherein said cover tilts between the closed position and the open position.

3. The waterproof mechanism as claimed in claim 1 wherein said cover slides between the closed position and the open position.

4. The waterproof mechanism as claimed in claim 1 wherein said cover and/or said housing has a boss, and said sealing member has an opening corresponding to the boss.

5. The waterproof mechanism as claimed in claim 1 wherein said cover member has a flat part and a wall part formed on a rim thereof.

6. The waterproof mechanism as claimed in claim 1 wherein said cover constitutes an exterior wall of the body.

7. The waterproof mechanism as claimed in claim 1 wherein said housing has a face which confronts the sealing member and has a smaller area than that of the sealing member.

8. The waterproof mechanism as claimed in claim 1 wherein said sealing member is formed of an elastic material and has a flat part and a wall part formed on an entire rim thereof.

9. The waterproof mechanism as claimed in claim 1 wherein said sealing member is formed in an elastic material, said sealing member being sandwiched between the housing receptacle and the cover after having the sealing member face the edges of the cover member.

10. The waterproof mechanism as claimed in claim 1, wherein the housing receptacle is directly connected to the cover.

11. The waterproof mechanism as claimed in claim 10, wherein the sealing member includes an opening extending therethrough, and the housing receptacle is connected to the cover through the opening.

12. The waterproof mechanism as claimed in claim 1, wherein the housing receptacle is larger than the external part.

13. A camera comprising:
    a camera body having a room for accommodating an external part;
    an opening connected to said room;
    a cover for closing said opening;
    a housing receptacle for receiving the external part, the housing is connected to said cover and moves with the cover between a closed position at which the opening is closed and a open position at which the opening opens; and
    a sealing member which faces at least an entire rim of the cover and is capable of forming a liquid-tight seal between the body and the cover, wherein said sealing member is sandwiched between the housing and the cover.

14. The camera as claimed in claim 13 wherein said external part is a film cartridge.

15. The camera as claimed in claim 14 wherein said housing has an outlet for feeding a film from the cartridge to the camera body.

16. The camera as claimed in claim 15 which further comprises an automatic film feeder.

17. The camera as claimed in claim 13 wherein said external part is a battery.

18. The camera as claimed in claim 13 wherein said cover constitutes an exterior wall of the camera body.

19. The camera of claim 13, wherein the housing receptacle is directly connected to the cover.

20. The camera of claim 13, wherein the sealing member includes an opening extending therethrough, and the housing receptacle is connected to the cover through the opening.

21. The camera of claim 13, wherein the housing receptacle is larger than the external part.

* * * * *